US011114973B2

United States Patent
Fukushima et al.

(10) Patent No.: US 11,114,973 B2
(45) Date of Patent: Sep. 7, 2021

(54) MOTOR CONTROL DEVICE, METHOD FOR CONTROLLING MOTOR CONTROL DEVICE, CONTROL PROGRAM, AND STORAGE MEDIUM

(71) Applicant: OMRON Corporation, Kyoto (JP)

(72) Inventors: Masanori Fukushima, Kusatsu (JP);
Ryoichi Watanabe, Otsu (JP);
Kimikazu Kubo, Moriyama (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/644,979

(22) PCT Filed: Oct. 25, 2018

(86) PCT No.: PCT/JP2018/039752
§ 371 (c)(1),
(2) Date: Mar. 6, 2020

(87) PCT Pub. No.: WO2019/107030
PCT Pub. Date: Jun. 6, 2019

(65) Prior Publication Data
US 2020/0287500 A1 Sep. 10, 2020

(30) Foreign Application Priority Data

Nov. 30, 2017 (JP) .............................. JP2017-230926

(51) Int. Cl.
*H02P 29/20* (2016.01)
(52) U.S. Cl.
CPC .................... *H02P 29/20* (2016.02)
(58) Field of Classification Search
CPC ...... H02P 1/00; H02P 1/04; H02P 1/06; H02P 1/08; H02P 1/12; H02P 1/16; H02P 1/163; H02P 1/18; H02P 1/24; H02P 1/26; H02P 1/28; H02P 1/42; H02P 1/46; H02P 1/465; H02P 1/54; H02P 3/00; H02P 3/06; H02P 3/12; H02P 3/14; H02P 3/24; H02P 6/00; H02P 6/005; H02P 6/15; H02P 6/24; H02P 6/26; H02P 6/28; H02P 7/00; H02P 7/03; H02P 8/00; H02P 8/04; H02P 15/00;
(Continued)

(56) References Cited

U.S. PATENT DOCUMENTS 4,284,943 A * 8/1981 Rowe .................... E21B 43/128
137/487.5

FOREIGN PATENT DOCUMENTS

JP     H8-47259 A     2/1996
JP     09093987 A * 4/1997 ................ H02P 7/63
(Continued)

OTHER PUBLICATIONS

An English translation of the International Search Report("ISR") of PCT/JP2018/039752 dated Jan. 29, 2019.
(Continued)

*Primary Examiner* — Antony M Paul
(74) *Attorney, Agent, or Firm* — Metrolex IP Law Group, PLLC

(57) ABSTRACT

In a technique for reducing the number of input terminals of a motor control device, flexibility of designing is improved. A terminal allocating section (23) is provided for setting, in accordance with selection by a user, which of a plurality of input terminals (11) is to be allocated to each of a plurality of function input terminals (21).

4 Claims, 7 Drawing Sheets

(58) Field of Classification Search
CPC .......... H02P 21/00; H02P 21/22; H02P 23/00; H02P 25/00; H02P 27/00; H02P 27/04; H02P 27/06
See application file for complete search history.

(56) References Cited

FOREIGN PATENT DOCUMENTS

| | | |
|---|---|---|
| JP | H9-93987 A | 4/1997 |
| JP | 2001-286169 A | 10/2001 |
| JP | 2008-131671 A | 6/2008 |
| WO | 2013/057767 A1 | 4/2013 |
| WO | WO-2013057767 A1 * | 4/2013 .............. H02P 31/00 |

OTHER PUBLICATIONS

The Written Opinion ("WO") of PCT/JP2018/039752 dated Jan. 29, 2019.

Extended European Search report (EESR) dated Jul. 23, 2021 in a counterpart European patent application.

* cited by examiner

FIG. 2

| NAME OF FUNCTION INPUT TERMINAL | ALLOCATED INPUT TERMINAL |
|---|---|
| ⋮ | ⋮ |
| REVERSE DIRECTION DRIVING INHIBITION INPUT | IN1 |
| ⋮ | ⋮ |
| | |
| | |
| | |
| | |
| | |
| | |
| ⋮ | ⋮ |
| COMPULSIVE BRAKE LOCKING INPUT | IN2 |
| ⋮ | ⋮ |
| ⋮ | ⋮ |
| FORWARD DIRECTION OPERATION COMMAND INPUT | IN1 |
| ⋮ | ⋮ |
| DIRECT CURRENT BRAKING COMMAND INPUT | IN2 |
| ⋮ | ⋮ |
| OPERATION COMMAND SWITCHING INPUT | IN3 |
| FREQUENCY COMMAND SWITCHING INPUT | IN3 |
| ⋮ | ⋮ |
| | |
| | |
| | |
| | |
| ⋮ | ⋮ |

Terminals: IN1, IN2, IN3, IN4

FIG. 3

| NAME OF FUNCTION INPUT TERMINAL | VALUE |
|---|---|
| REVERSE DIRECTION DRIVING INHIBITION INPUT | 1: ALLOCATE IN1 |
| ⋮ | ⋮ |
| FORWARD DIRECTION OPERATION COMMAND INPUT | 1: ALLOCATE IN1 |
| ⋮ | ⋮ |
| COMPULSIVE BRAKE LOCKING INPUT | 2: ALLOCATE IN2 |
| ⋮ | ⋮ |
| DIRECT CURRENT BRAKING COMMAND INPUT | 2: ALLOCATE IN2 |
| ⋮ | ⋮ |
| OPERATION COMMAND SWITCHING INPUT | 3: ALLOCATE IN3 |
| ⋮ | ⋮ |
| FREQUENCY COMMAND SWITCHING INPUT | 3: ALLOCATE IN3 |
| ⋮ | ⋮ |

FIG. 4

| | ⋮ | ⋮ |
|---|---|---|
| REVERSE DIRECTION DRIVING INHIBITION INPUT | SELECTION OF PORT | SELECT INPUT TERMINAL TO BE ALLOCATED<br>0: NO ALLOCATION<br>1: ALLOCATE IN1<br>2: ALLOCATE IN2<br>⋮ |
| | ⋮ | ⋮ |

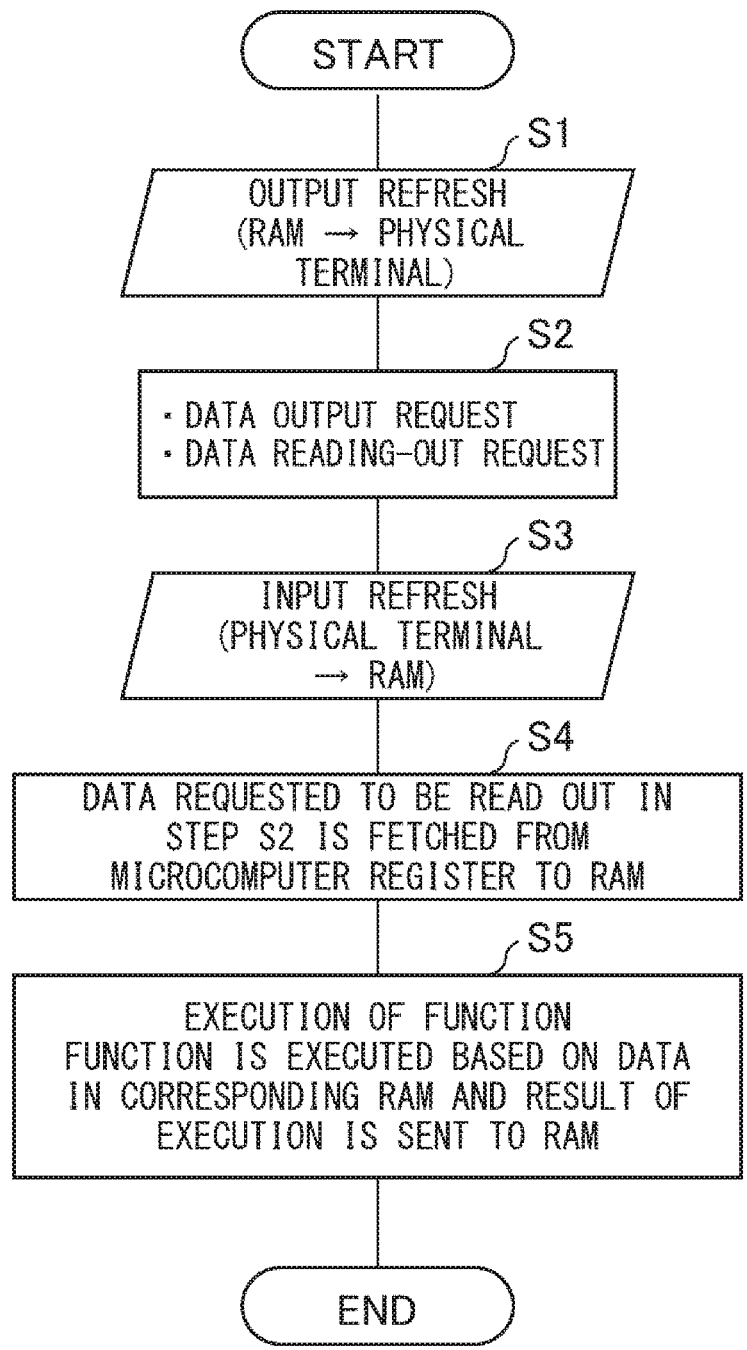

| NAME OF FUNCTION INPUT TERMINAL OR DELAY TIMER | VALUE |
|---|---|
| OUTPUT BLOCK INPUT | 4: ALLOCATE IN4 |
| ⋮ | ⋮ |
| OUTPUT BLOCK INPUT: DELAY TIMER (ms) | 10 |
| OPERATION COMMAND SWITCHING INPUT | 4: ALLOCATE IN4 |
| ⋮ | ⋮ |
| OPERATION COMMAND SWITCHING INPUT: DELAY TIMER (ms) | 20 |

FIG. 9

- ☑ FORWARD DIRECTION DRIVING INHIBITION INPUT
- ☐ REVERSE DIRECTION DRIVING INHIBITION INPUT
- ☐ ABNORMAL STOP INPUT
- ☐ OUTPUT BLOCK INPUT
- ☐ FORWARD DIRECTION TORQUE RESTRICTION INPUT
- ☐ REVERSE DIRECTION TORQUE RESTRICTION INPUT
- ☐ NEAR-ORIGIN INPUT
- ☐ EXTERNAL LATCH INPUT 1
- ☐ EXTERNAL LATCH INPUT 2
- ☐ ABNORMAL RELEASE INPUT
- ☐ COMPULSIVE BRAKE LOCKING INPUT
- ☐ COMPULSIVE BRAKE RELEASE INPUT
- ☐ BRAKE FEEDBACK INPUT
- ☑ FORWARD DIRECTION OPERATION COMMAND INPUT
- ☐ REVERSE DIRECTION OPERATION COMMAND INPUT
- ☐ DIRECT CURRENT BRAKING COMMAND INPUT
- ☐ PRELIMINARY EXCITATION COMMAND INPUT
- ☐ OPERATION COMMAND SWITCHING INPUT
- ☐ FREQUENCY COMMAND SWITCHING INPUT
- ☐ MONITOR INPUT 1
- ☐ MONITOR INPUT 2
- ☐ MONITOR INPUT 3
- ☐ MONITOR INPUT 4
- ☐ MONITOR INPUT 5
- ☐ MONITOR INPUT 6
- ☐ CONTROL GAIN SWITCHING INPUT

| GENERAL-PURPOSE INPUT 1 (IN1) | GENERAL-PURPOSE INPUT 2 (IN2) | GENERAL-PURPOSE INPUT 3 (IN3) | GENERAL-PURPOSE INPUT 4 (IN4) |

MOTOR CONTROL DEVICE, METHOD FOR CONTROLLING MOTOR CONTROL DEVICE, CONTROL PROGRAM, AND STORAGE MEDIUM

TECHNICAL FIELD

The present invention relates to a motor control device, a method for controlling a motor control device, a control program, and a storage medium.

BACKGROUND ART

Conventionally, a technique for reducing the number of input terminals of a motor control device to which an external device is connected has been studied. An example of such a technique is disclosed in Patent Literature 1.

In the inverter device (motor control device) disclosed in Patent Literature 1, a plurality of set parameters are set for one external input terminal (input terminal), and any one of a plurality of internal terminal number specifications is allocated to each of these set parameters. The plurality of internal terminal number specifications correspond to a plurality of functions in the inverter device.

In the inverter device disclosed in Patent Literature 1, at least two of the functions in the inverter device can be allocated to one external input terminal, so that the number of external input terminals can be reduced.

CITATION LIST

Patent Literature

[Patent Literature 1]
Japanese Patent Application Publication Tokukaihei No. 9-93987 (Publication date: Apr. 4, 1997)

SUMMARY OF INVENTION

Technical Problem

In the inverter device disclosed in Patent Literature 1, the number of functions that can be allocated per external input terminal is identical to the number of preset parameters. Therefore, in the inverter device disclosed in Patent Literature 1, flexibility of designing is low (e.g., there is a need to add a master device in order to process an external input signal corresponding to a function which is not allocated to any external input terminal).

An aspect of the present invention aims to implement a motor control device, a method for controlling a motor control device, a control program, and a storage medium, which can improve flexibility of designing in the technique for reducing the number of input terminals of a motor control device.

Solution to Problem

In order to solve the foregoing problem, a motor control device in accordance with one aspect of the present invention includes: a plurality of input terminals to which an input-side external device is connected; a plurality of function input terminals which are included in a main control section of the motor control device and which correspond to a plurality of functions of the motor control device, respectively; and a terminal allocating section for setting, in accordance with selection by a user, which of the plurality of input terminals is to be allocated to each of the plurality of function input terminals.

In order to solve the foregoing problem, a method for controlling a motor control device in accordance with one aspect of the present invention is a method for controlling a motor control device including a plurality of input terminals to which an input-side external device is connected, said method comprising a terminal allocating step of setting, in accordance with selection by a user, which of the plurality of input terminal is to be allocated to each of a plurality of function input terminals which are included in a main control section of the motor control device and which correspond to a plurality of functions of the motor control device, respectively.

Advantageous Effects of Invention

One aspect of the present invention can improve flexibility of designing in the technique for reducing the number of input terminals of a motor control device.

BRIEF DESCRIPTION OF DRAWINGS

FIG. 2 is an image diagram showing a specific example in which a terminal allocating section sets allocation of an input terminal to a function input terminal.

FIG. 3 is a table showing a specific example of a displayed content displayed by a display section of a control tool at the time of setting allocation of an input terminal to a function input terminal.

FIG. 4 is a diagram showing an exemplary set parameter possessed by a function input terminal.

FIG. 5 is a flowchart showing an exemplary flow of processing in a main MPU and its surrounding elements.

FIG. 9 is a diagram showing an example of a content which a display output section causes a display device to display.

DESCRIPTION OF EMBODIMENTS

Hereinafter, an embodiment according to one aspect of the present invention (hereinafter, also referred to as "the present embodiment") will be described with reference to the drawings. However, the present embodiment described below is merely illustrative of the present invention in all respects. It will be appreciated that various revisions and modifications can be performed without departing from the scope of the present invention. In other words, in the implementation of the present invention, a specific configuration corresponding to an embodiment may be appropriately adopted.

§ 1 Application Example

Figure 1:
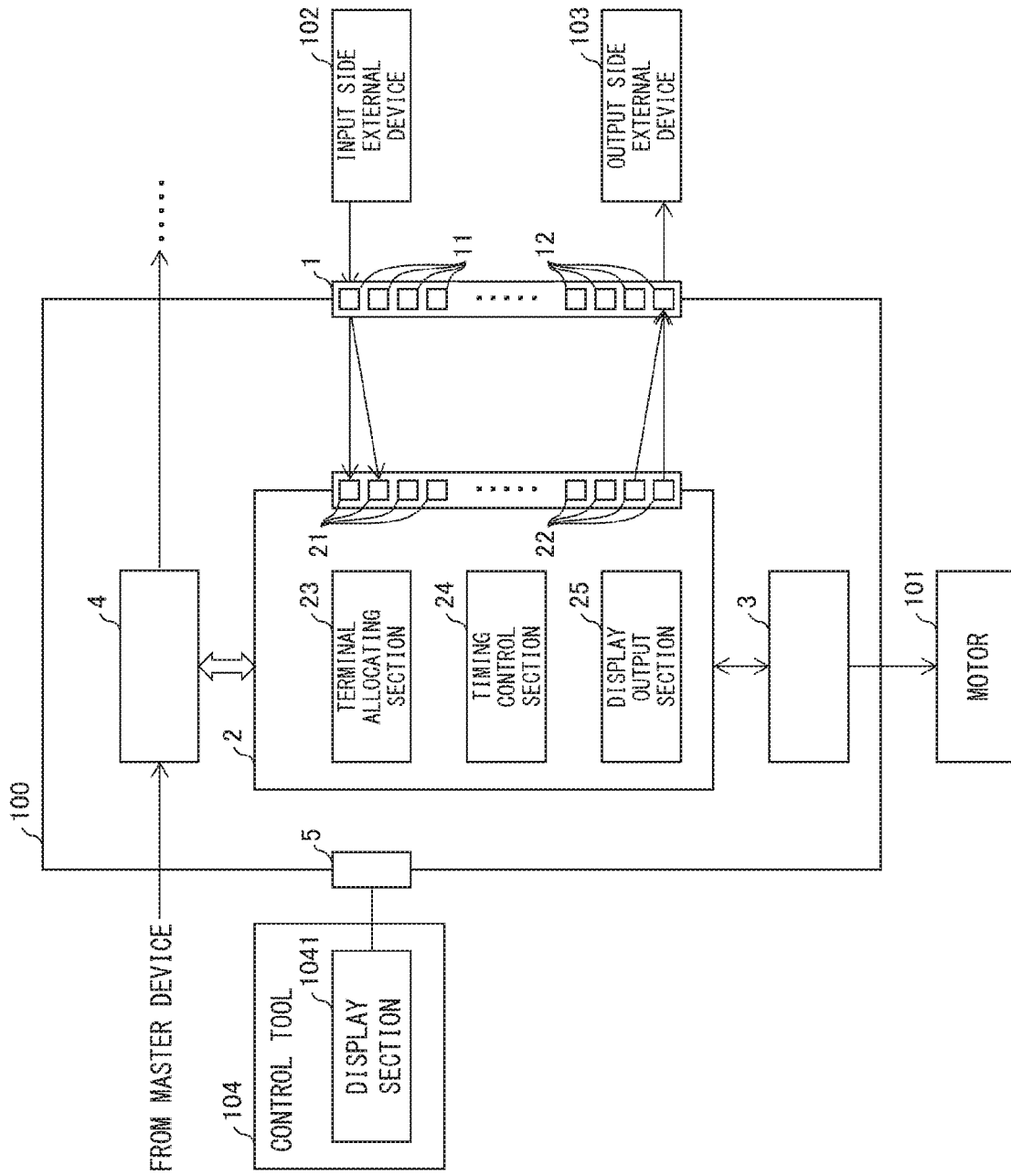
FIG. 1 is a block diagram showing a schematic configuration of a motor control device according to one embodiment according to one aspect of the present invention.

FIG. 1 is a block diagram showing a schematic configuration of a motor control device 100 according to the present embodiment. First, referring to FIG. 1, an exemplary scene to which the present invention is applied will be described.

The motor control device 100 controls a motor 101. The motor control device 100 comprises: a connector 1, a main MPU (Micro Processing Unit) 2, an MCU (Micro Controller Unit) 3, an ASIC (Application Specific Integrated Circuit) 4, and an interface 5.

The connector 1 has a plurality of input terminals 11 and a plurality of output terminals 12. The main MPU (main control section) 2 has a plurality of function input terminals 21, a plurality of function output terminals 22, a terminal allocating section 23, a timing control section 24, and a display output section 25. Hereinafter, the plurality of input terminals 11 will be described focusing on one input terminal 11 unless the number thereof is specified. Hereinafter, the plurality of output terminals 12 will be described focusing on one output terminal 12 unless the number thereof is specified. Hereinafter, the plurality of function input terminals 21 will be described focusing on one function input terminal 21 unless the number thereof is specified. Further, the plurality of function output terminals 22 will be described below focusing on one function output terminal 22 unless the number thereof is specified.

The input terminal 11 is an input terminal of the motor control device 100 to which an input-side external device 102 positioned at an upstream of the motor control device 100 is connected. The input-side external device 102 is connected to the input terminal 11, so that signals outputted from the input-side external device 102 can be supplied to the main MPU 2 via the input terminal 11. Examples of the input-side external device 102 include switches and various controllers such as a programmable logic controller. Separate input-side external devices 102 may be connected to the plurality of input terminals 11, respectively, or the same input-side external device 102 may be connected to at least two of the plurality of input terminals 11.

The main MPU 2 performs a plurality of functions in the motor control device 100. The main MPU 2 receives the signal from the input-side external device 102 when the signal is supplied to at least one of the plurality of function input terminals 21. The plurality of function input terminals 21 are associated with the plurality of functions one-to-one, one-to-x (2≤x), or x-to-one. The main MPU 2 then performs the function in the motor control device 100 which function corresponds to the command contained in the received signal.

The terminal allocating section 23 sets which of the plurality of input terminals 11 is allocated to each of the plurality of function input terminals 21 corresponding to the plurality of functions in the motor control device 100 in response to the selection by the user.

As a result, one input terminal 11 can be allocated to at least two of the plurality of function input terminals 21, so that the number of input terminals 11 can be smaller than the number of function input terminals 21. Therefore, the number of the input terminals 11 can be reduced. The reduction in the number of the input terminals 11 leads to downsizing of the motor control device 100, a reduction in the number of wiring steps in the motor control device 100, and a reduction in the costs (manufacture cost and original cost) of the motor control device 100. This also allows any number of function input terminals 21 to be allocated to one input terminal 11, as long as the performance of the motor control device 100 allows. Therefore, flexibility of designing can be improved as compared to the prior art.

The timing control section 24 controls, in accordance with selection by a user, timing of supplying, to at least one function input terminal 21 included in at least two of the plurality of function input terminals 21, a signal supplied to the input terminal 11. As a specific example, the timing control section 24 causes timing of supplying a signal to a first function input terminal to be different from timing of supplying the signal to a second function input terminal, the first function input terminal and the second function input terminal being included in the plurality of function input terminals 21 and being different from each other. As a result, a signal can be supplied to the first function input terminal and the second function input terminal at different timings. Therefore, for example, this is convenient for executing a function corresponding to the second function input terminal some time after executing a function corresponding to the first function input terminal.

The display output section 25 causes a display device to display a correspondence between the input terminal 11 and one of the plurality of function input terminals 21 to which one the input terminal 11 has been allocated. As a result, the user can check the correspondence between the input terminal 11 and one of the function input terminals 21 to which one the input terminal 11 has been allocated. Therefore, the user can check if the correspondence is different from one intended by the user or if the correspondence itself is inappropriate.

The method for controlling the motor control device 100 may be executed by a computer such as main MPU 2. In this case, a control program for causing a computer to execute the method for controlling the motor control device 100 and a computer-readable storage medium in which the control program is stored are also encompassed in the scope of the present invention.

§ 2 Configuration Example

Next, the schematic configuration of the motor control device 100 will be described with reference to FIG. 1.

The MCU 3 is controlled by the main MPU 2, generates a current for controlling the motor 101 in response to this control, and supplies the current to the motor 101. That is, a typical example of the control of the motor 101 by the motor control device 100 is the control of a current supplied from the MCU 3 to the motor 101.

The ASIC 4 communicates with a master device (e.g., programmable logic controller, not shown) that centrally controls an industrial network system containing the motor control device 100. Examples of such an industrial network system include systems based on any of Ether CAT®, EtherNet/IP®, and Modbus®.

The interface 5 is an interface between the motor control device 100 and a control tool 104 at an outside of the motor control device 100. By causing the motor control device 100 and the control tool 104 to communicate with each other using the interface 5 as an interface, the user can check the status of the motor control device 100 via the control tool 104 and set various parameters for the main MPU 2 via the control tool 104.

By causing the motor control device 100 and the control tool 104 to communicate with each other, the user can set, via the control tool 104, the function input terminal 21 to which the terminal allocating section 23 allocates the input terminal 11. Furthermore, by causing the motor control device 100 and the control tool 104 to communicate with each other, the user can control, via the control tool 104, timing when the timing control section 24 supplies, to the function input terminal 21 to be controlled, the signal having been supplied to the input terminal 11. Furthermore, the control tool 104 has a display section 1041 for performing various displays relating to the control tool 104. By causing the motor control device 100 and the control tool 104 to communicate with each other, it is possible to cause this display section 1041 to serve as the aforementioned display device caused by display output section 25 to display data.

The output terminal 12 is an output terminal of the motor control device 100 to which an output-side external device 103 which is positioned at a downstream of the motor control device 100 is connected. The output-side external device 103 is connected to the output terminal 12 so that a signal outputted from the function output terminal 22 of the main MPU 2 can be supplied to the output-side external device 103 through the output terminal 12. The plurality of function output terminals 22 are also associated with the plurality of functions one-to-one, one-to-x, or x-to-one. Upon receiving the signal outputted from the main MPU 2, the output-side external device 103 operates according to the function of the motor control device 100 which is included in the signal. Examples of the output-side external device 103 include a warning light and a valve. Separate output-side external devices 103 may be connected to the plurality of output terminal 12, respectively, or the same output-side external device 103 may be connected to at least two of the plurality of output terminals 12.

FIG. 2 is an image diagram showing one specific example in which the terminal allocating section 23 sets allocation of the input terminal 11 to the function input terminal 21.

The Motor control device 100 can perform a plurality of functions. Examples of the function input terminal 21 include "reverse direction driving inhibition input", "forward direction operation command input", "compulsive brake locking input", "direct current braking command input", "operation command switching input", and "frequency command switching input". Individual function input terminal 21 listed here are briefly described below.

"Reverse direction driving inhibition input": the function input terminal 21 that prevents the motor 101 from driving in a reverse direction "Forward direction operation command input": the function input terminal 21 corresponding to the function of operating the motor 101 in a forward direction "Compulsive brake locking input": the function input terminal 21 corresponding to the function of compulsively operating a brake which physically stops rotation of the motor 101

"Direct current braking command input": the function input terminal 21 corresponding to the function of electrically stopping rotation of the motor 101

"Operation command switching input": the function input terminal 21 corresponding to the function of selecting a path of a command for operation of the motor control device 100 (communication from the master device/signal input to the input terminal 11)

"Frequency command switching input": the function input terminal 21 corresponding to the function of selecting a path to set frequency to the motor control device 100 (communication from the master device/signal input to the input terminal 11)

The terminal allocating section 23 allocates a terminal IN1 as the input terminal 11 to "reverse direction driving inhibition input" and "forward direction operation command input". Consequently, in response to a signal supplied from the terminal IN1 to the main MPU 2, the main MPU 2 operates the motor 101 in the forward direction while preventing the motor 101 from being driven in the reverse direction, so that the motor 101 can be operated in the forward direction more reliably.

The terminal allocating section 23 allocates a terminal IN2 as the input terminal 11 to "compulsive brake locking input" and "direct current braking command input". As a result, the main MPU 2 physically and electrically stops rotation of the motor 101 in response to a signal supplied from the terminal IN2 to the main MPU 2, so that the rotation of motor 101 can be stopped more reliably.

The terminal allocating section 23 allocates a terminal IN3 as the input terminal 11 to "operation command switching input" and "frequency command switching input". This allows for switching between a remote operation in which the master device operates the motor control device 100 and a local operation in which the user operates the motor control device 100 using the control tool 104.

FIG. 3 is a table showing a specific example of the display content displayed by the display section 1041 at the time of setting allocation of the input terminal 11 to the function input terminal 21.

In the FIG. 3 table, the "name of function input terminal" column shows the name of each function input terminal 21, as with the "name of function input terminal" column in FIG. 2. On the other hand, in the FIG. 3 table, the "value" column shows a value indicating which input terminal 11 is allocated for each function input terminal 21. By causing the display section 1041 to display such a table, the user can visually check the setting of the allocation.

FIG. 4 is a diagram showing an exemplary set parameter of the function input terminal 21.

According to FIG. 4, the set parameter of "reverse direction driving inhibition input" as the function input terminal 21 contains a parameter "selection of port". This parameter "selection of port" is set to either "0", which is a value indicating that the input terminal 11 is not allocated to the "reverse direction driving inhibition input", or "1", "2", . . . , which is a value indicating that the input terminal 11 is allocated to the "reverse direction driving inhibition input". From FIG. 4, it can be seen that whether or not the input terminal 11 is allocated to the function input terminal 21 can be checked and which of the plurality of input terminals 11 is to be allocated to the function input terminal 21 can be set.

FIG. 5 is a flow chart illustrating an exemplary process flow in the main MPU 2 and its surrounding elements.

First, output refresh (RAM→physical terminal) is performed (step S1). The output refresh (RAM→physical terminal) is a process of outputting data on a RAM of the main MPU 2 to a physical terminal of the main MPU 2. Here, the physical terminal is an output port on the main MPU 2, and corresponds to a process of outputting a signal to the output terminal 12 and the MCU 3 (microcomputer for controlling the motor 101).

Subsequently, a data output request and/or a data reading-out request are performed (step S2). That is, in the step S2, the MCU 3 transmits data for output to the main MPU 2, and/or the main MPU 2 requests the MCU 3 to read out status information indicative of the status of the motor 101 or the like.

Subsequently, input refresh (physical terminal→RAM) is performed (step S3). The input refresh (physical terminal→RAM) is a process of extracting a signal state from the physical terminal of the main MPU 2 and loading it in the RAM. Here, the physical terminal is an input port on the main MPU 2, and corresponds to a process of reading out data from the input terminal 11 and the MCU 3 (microcomputer for controlling the motor 101).

Subsequently, the MCU 3 fetches, from a microcomputer register (not shown) of the main MPU 2 to the RAM (not shown), the data requested to be read out in the step S2 (step S4).

Subsequently, the main MPU 2 executes the function based on the data in the corresponding RAM, and sends the result of the execution to the RAM (execution of function) (step S5).

It should be noted that an initial value at the time of turning on the power of the motor control device 100 may be outputted until a first execution of a function in the motor control device 100 is performed. In addition, in the step S3, data is copied to the RAM in charge of the corresponding function based on the value set in the parameter "selection of port" in FIG. 4.

Figure 6:
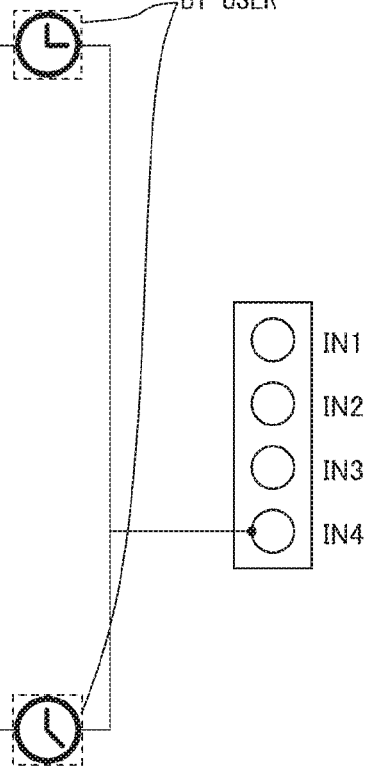
FIG. 6 is an image diagram showing another specific example in which the terminal allocating section sets allocation of an input terminal to a function input terminal.

FIG. 6 is an image diagram showing another specific example in which the terminal allocating section 23 sets allocation of the input terminal 11 to the function input terminal 21.

Examples of the function input terminal 21 include "output block input (first function input terminal)" and "operation command switching input (second function input terminal)". The function input terminals 21 listed here are briefly described below.

"Output block input": the function input terminal 21 corresponding to the function of stopping outputting to the motor 101 and putting the motor 101 in a free run status.

"Operation command switching input": the function input terminal 21 corresponding to the function of selecting a path of a command for operation of the motor control device 100 (communication from the master device/signal input to the input terminal 11)

The timing control section 24 causes the timing of supplying, to "output block input", the signal having been supplied to the terminal IN4 as the input terminal 11 to be different from the timing of supplying the signal to the "operation command switching input".

Figures 7, 8:
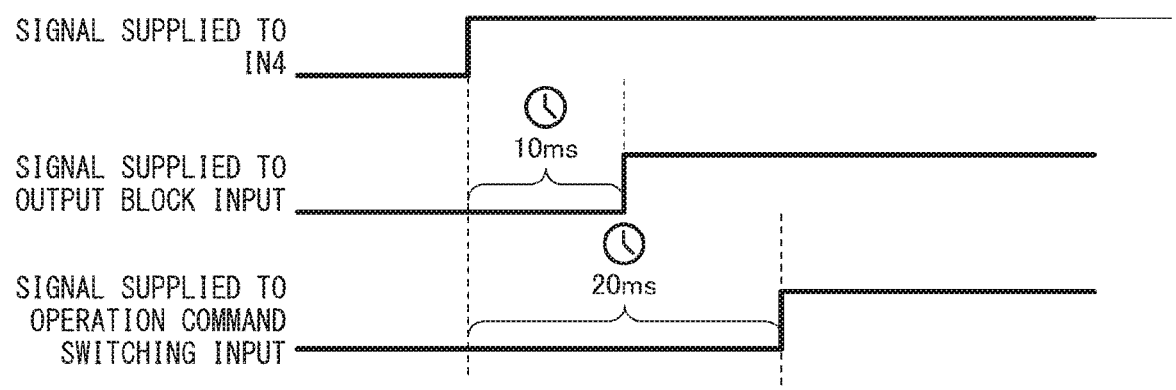
FIG. 7 is a table showing another specific example of a displayed content displayed by a display section of a control tool at the time of setting allocation of an input terminal to a function input terminal.
FIG. 8 is a timing chart that compares a signal supplied to an input terminal, a signal supplied to "output block input", and a signal supplied to "operation command switching input".

FIG. 7 is a table showing another specific example of the display content displayed by the display section 1041 at the time of setting the allocation of the input terminal 11 to the function input terminal 21.

In the FIG. 7 table, the "name of function input terminal or delay timer" column shows the name of the parameter "delay timer" in addition to the name of each function input terminal 21. On the other hand, in the FIG. 7 table, the "value" column shows a value indicating which input terminal 11 is allocated for each function input terminal 21. In addition, in the FIG. 7 table, the "value" column shows a delay time (unit: ms (milliseconds)) indicative of how delayed, with respect to a reference time, the timing with which the timing control section 24 supplies the signal having been supplied to the input terminal 11 to the corresponding function input terminal 21 is.

FIG. 8 is a timing chart comparing a signal supplied to the input terminal 11 (terminal IN4), a signal supplied to the "output block input", and a signal supplied to the "operation command switching input".

The rising edge of the signal supplied to the "output block input" is delayed by 10 ms with respect to the rising edge of the signal supplied to the terminal IN4. On the other hand, the rising edge of the signal supplied to the "operation command switching input" is delayed by 20 ms with respect to the rising edge of the signal supplied to the terminal IN4. In other words, the rising edge of the signal supplied to the "operation command switching input" is delayed by 10 ms with respect to the rising edge of the signal supplied to the "output block input". In this manner, the timing control section 24 can cause the timing of supplying, to the "output block input", the signal having been supplied to the input terminal 11 (terminal IN4) to be different from the timing of supplying the signal to the "operation command switching input".

FIG. 9 is a diagram showing an example of the display content which the display output section 25 causes the display device to display. In the diagram shown in FIG. 9, a correspondence between the input terminal 11 and one of the plurality of function input terminals 21 to which one the input terminal 11 has been allocated (corresponding to the checked one in FIG. 9) is shown. Further, in the drawing shown in FIG. 9, a list in which this correspondence is shown is created in one tab, and such a tab is created for each of the plurality of input terminals 11, thereby forming one displayed content. The display output section 25 creates such a display content and causes the display device to display the display content. The display device may be the display section 1041 or another display device.

Alternatively, the display output section 25 may create the display content indicating the aforementioned correspondence in an image diagram of connection, and cause the display device to display the display content. Alternatively, the display output section 25 may create, as the display content, a list of the function input terminal 21 allocated to the input terminal 11 based on this input terminal 11, and cause the display device to display the list.

Further, by enabling the checking of the display content related to FIG. 9, the display content related to FIG. 9 may be a setting window itself for setting the function input terminal 21 to which the input terminal 11 is allocated.

In the motor control device 100, according to the same principles as in the terminal allocating section 23, which of the plurality of output terminals 12 is to be allocated to each of the plurality of function output terminals 22 that are included in the main MPU 2 and that correspond to the plurality of functions in the motor control device 100 may be set according to selection by a user. In this case, the main MPU 2 may supply a logical disjunction (OR) of signals having been outputted from each of at least two function output terminals 22 to which the same output terminal 12 has been allocated, to that output terminal 12. Instead of the logical disjunction, an exclusive disjunction (EXOR), a logical conjunction (AND), a joint denial (NOR), or Sheffer stroke (NAND) may be applied, or a combination of two or more of these logical operations and negations (NOT) may be applied.

[Software Implementation Example]

Control blocks of the motor control device 100 (particularly, the terminal allocating section 23, the timing control section 24, and the display output section 25) can be realized by a logic circuit (hardware) provided in an integrated circuit (IC chip) or the like or can be alternatively realized by software.

In the latter case, the motor control device 100 includes a computer that executes instructions of a program that is software realizing the foregoing functions. The computer, for example, includes at least one processor and at least one computer-readable storage medium storing the program. An object of the present invention can be achieved by the processor of the computer reading and executing the program stored in the storage medium. Examples of the processor encompass a central processing unit (CPU). Examples of the storage medium encompass a "non-transitory tangible medium" such as a read only memory (ROM), a tape, a disk, a card, a semiconductor memory, and a programmable logic circuit. The computer may further include a random access memory (RAM) or the like in which the program is loaded. Further, the program may be made available to the computer via any transmission medium (such as a communication network and a broadcast wave) which allows the program to be transmitted. Note that an aspect of the present invention can also be achieved in the form of a computer data signal in which the program is embodied via electronic transmission and which is embedded in a carrier wave.

Aspects of the present invention can also be expressed as follows:

A motor control device in accordance with one aspect of the present invention comprises: a plurality of input terminals to which an input-side external device is connected; a plurality of function input terminals which are included in a main control section of the motor control device and which correspond to a plurality of functions of the motor control device, respectively; and a terminal allocating section for setting, in accordance with selection by a user, which of the plurality of input terminals is to be allocated to each of the plurality of function input terminals.

A method for controlling a motor control device in accordance with one aspect of the present invention is a method for controlling a motor control device including a plurality of input terminals to which an input-side external device is connected, said method comprising a terminal allocating step of setting, in accordance with selection by a user, which of the plurality of input terminal is to be allocated to each of a plurality of function input terminals which are included in a main control section of the motor control device and which correspond to a plurality of functions of the motor control device, respectively.

With the arrangement, single input terminal can be allocated to at least two of the plurality of function input terminals, so that the number of the input terminals can be smaller than the number of the function input terminals. Accordingly, with the arrangement, it is possible to reduce the number of the input terminals. The reduction in the number of the input terminals leads to downsizing of the motor control device, a reduction in the number of wiring steps in the motor control device, and a reduction in the costs (manufacture cost and original cost) of the motor control device.

Furthermore, with the arrangement, it is possible to allocate any number of function input terminals to one input terminal, as long as the performance of the motor control device allows. Therefore, flexibility of designing the motor control device can be improved as compared to the prior art.

The motor control device in accordance with one aspect of the present invention is preferably arranged so as to further comprise a timing control section which, with respect to each of at least one of the plurality of input terminals, in accordance with selection by the user, causes timing of supplying a first function input terminal with a signal having been supplied to said at least one input terminal to be different from timing of supplying a second function input terminal with the signal, the first function input terminal and the second function input terminal being included in the plurality of function input terminals and being different from each other.

With the arrangement, it is possible to supply a signal to the first function input terminal and the second function input terminal at different timings. Therefore, for example, this is convenient for executing a function corresponding to the second function input terminal some time after executing a function corresponding to the first function input terminal.

The motor control device in accordance with one aspect of the present invention is preferably arranged so as to further comprise a display output section which, with respect to each of at least one of the plurality of input terminals, causes a display device to display correspondence between said at least one input terminal and one of the plurality of function input terminals to which one said at least one input terminal has been allocated.

With the arrangement, a user can check a correspondence between the input terminal and one of the plurality of function input terminals to which one the input terminal has been allocated. Therefore, the user can check if the correspondence is different from one intended by the user or if the correspondence itself is inappropriate.

The method for controlling the motor control device in accordance with one aspect of the present invention may be executed by a computer. In this case, a control program for causing a computer to execute the method for controlling the motor control device and a computer-readable storage medium in which the control program is stored are also encompassed in the scope of the present invention.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1 Connector
2 Main MPU (main control section)
3 MCU
4 ASIC
5 Interface
11 Input terminal
12 Output terminal
21 Function input terminal
22 Function output terminal
23 Terminal allocating section
24 Timing control section
25 Display output section
100 Motor control device
101 Motor
102 Input-side external device
103 Output-side external device
104 Control tool
1041 Display section

The invention claimed is:

1. A motor control device, comprising:
a plurality of input terminals to which an input-side external device is connected;
a plurality of function input terminals which are included in a main control section of the motor control device and which correspond to a plurality of functions of the motor control device, respectively; and
a terminal allocating section for setting, in accordance with selection by a user, which of the plurality of input terminals is to be allocated to each of the plurality of function input terminals,
the motor control device further comprising a timing control section which, with respect to each of at least one of the plurality of input terminals, in accordance with selection by the user, causes timing of supplying a first function input terminal with a signal having been supplied to said at least one input terminal to be different from timing of supplying a second function input terminal with the signal, the first function input terminal and the second function input terminal being included in the plurality of function input terminals and being different from each other.

2. The motor control device as set forth in claim 1, further comprising a display output section which, with respect to each of at least one of the plurality of input terminals, causes a display device to display correspondence between said at least one input terminal and one of the plurality of function input terminals to which one said at least one input terminal has been allocated.

3. A method for controlling a motor control device including a plurality of input terminals to which an input-side external device is connected, said method comprising:

a terminal allocating step of setting, in accordance with selection by a user, which of the plurality of input terminal is to be allocated to each of a plurality of function input terminals which are included in a main control section of the motor control device and which correspond to a plurality of functions of the motor control device, respectively; and a timing control step of, with respect to each of at least one of the plurality of input terminals, in accordance with selection by the user, causing timing of supplying a first function input terminal with a signal having been supplied to said at least one input terminal to be different from timing of supplying a second function input terminal with the signal, the first function input terminal and the second function input terminal being included in the plurality of function input terminals and being different from each other.

4. A computer-readable and non-transitory storage medium in which a control program for causing a computer to carry out a method for controlling a motor control device as set forth in claim 3 is stored.

* * * * *